United States Patent
Busenga

[11] Patent Number: 5,836,022
[45] Date of Patent: Nov. 17, 1998

[54] AUTOMATIC LIQUID LEVEL CONTROL APPARATUS

[76] Inventor: Douglas Robert Busenga, 3730 Gaviota Ave., Long Beach, Calif. 90807

[21] Appl. No.: 991,450

[22] Filed: Dec. 16, 1997

[51] Int. Cl.$^6$ ...................................................... E04H 4/00
[52] U.S. Cl. ................................................................ 4/508
[58] Field of Search ................................. 4/508; 137/403, 137/426, 434

[56] References Cited

U.S. PATENT DOCUMENTS

| | | | |
|---|---|---|---|
| 3,760,837 | 9/1973 | Amren | 137/434 X |
| 4,138,967 | 2/1979 | Tamborrino | 119/78 |
| 4,274,365 | 6/1981 | Peters | 119/78 |
| 4,574,405 | 3/1986 | Tams | 4/508 |
| 4,586,532 | 5/1986 | Tsolkas | 137/426 |
| 4,606,373 | 8/1986 | Noland | 137/426 |
| 4,607,658 | 8/1986 | Fraser | 137/393 |
| 4,628,867 | 12/1986 | Brougham | 119/78 |
| 4,655,243 | 4/1987 | Keller | 137/403 |
| 4,706,310 | 11/1987 | Magnes | 4/508 |
| 4,853,986 | 8/1989 | Allen | 4/508 |
| 5,203,038 | 4/1993 | Gibbs | 4/508 |

OTHER PUBLICATIONS

The Pool Sentry™ Water Level Control.

*Primary Examiner*—Charles E. Phillips

[57] ABSTRACT

A versatile liquid level control apparatus that includes a horizontal base, a vertical support both of hollow construction to accept a ballast, and a stanchion with adjustment holes. Mounted to the stanchion is a liquid control valve assembly with a float arm and a float that responds to the liquid level in a reservoir. A conduit for liquid that is connected to a liquid supply source on one end and to the control valve on the other. The apparatus can be set on the deck of a reservoir with the vertical support, stanchion, control valve assembly which includes the float arm and float, in cantilever fashion over the reservoir. The apparatus can be used in above ground reservoirs by straddling the outside of the reservoir. The apparatus filled with ballast can be submerged and set on the steps, seat, or bottom of a pond and fill the reservoir in the submerged fashion. With the float in contact with the liquid line in each scenario the lowering of the float by a low liquid level lets liquid flow into the reservoir by opening the control valve. As the float rises, the float will reach a high liquid level closing the valve and stopping liquid flow at a predetermined level.

15 Claims, 10 Drawing Sheets

AUTOMATIC LIQUID LEVEL CONTROL APPARATUS

BACKGROUND

1. Field of Invention

This invention relates to maintaining the desired water level of swimming pools, hot tubs and ponds.

2. Description of Prior Art

Above ground and in ground swimming pools, hot tubs, ponds, reservoirs, and the like require frequent addition of water to maintain a desired level. This addition of water is usually accomplished manually by simply filling the reservoir with a garden hose. This method requires a watchful eye to detect the lowered water level and sufficient time to fill, yet not overfill the reservoir.

The need for an automatic reservoir leveling system has been observed by many inventors. The past leveling systems developed fall into two general categories, permanently mounted leveling systems and portable leveling systems. Permanently mounted leveling systems are more suitable for new reservoir construction, whereas, portable leveling systems are more suitable for existing reservoirs. For portable leveling systems it is important that the unit be adaptable to many different types of reservoirs. The decking around an in ground reservoir could have a rounded coping, could be sloped, could be constructed of wood, or could be an earthen surface. Above ground pools have a narrow retaining wall with a narrow top track snapped onto the retaining wall. More modern reservoir designs incorporate the decorative use of rocks, plants, waterfalls, and often use varying water depths to achieve a particular appearance. A portable, automatic reservoir leveling system must be adaptable to all of these and other reservoir configurations.

There are a wide variety of patents and systems developed to automatically maintain the water level in a reservoir. Frequently these systems require the use of bolts, particular housing shapes or semi-permanent mounting methods in order to attach the device to the reservoir. These systems are disclosed in U.S. Pat. No. 5,203,038 (Gibbs, 1993), U.S. Pat. No. 4,586,532 (Tsolkas, 1986), U.S. Pat. No. 4,853,986 (Allen, 1989) and in the commercially available Water Level Control™ by Pool Sentry. These are limited to only a few reservoir configurations and may not be adaptable to the more modern reservoir designs. A more versatile configuration can be found in U.S. Pat. No. 4,655,243 (Keller, 1987) in that the depth can be adjusted, however, the perpendicular orientation of the system may not be adaptable to sloping or rocky decks.

Most of these prior systems use a garden-hose with threaded ends, or the like, as the water source. There are two major disadvantages in using the garden hose as the water conduit. First, the hose may have to be uncoupled frequently to be used for maintenance of the deck areas. This frequent coupling and uncoupling is a nuisance and could cause leaking at the connection over time. Second, since a garden hose is threaded and is used around dirt and decking surfaces, the threads can become caked with dirt or damaged through normal usage. Damaged hose threads could also be a source of leaking at the connection of the pool leveling system. Leaking is wasteful of water and could cause marring of the deck surface.

OBJECTS AND ADVANTAGES

The present invention provides a simple, effective, and highly versatile method to maintain a desired water level automatically. Its attachment requires no bolts or clamping. The water conduit is a tube, attached to a needle valve and spigot configuration that allows use of the garden hose and the present invention at the same time. It is available in a wide variety of colors allowing the apparatus to blend in with its surroundings. It uses no ferrous connectors or other elements so there will be no possibility of rust stains on the reservoir deck or adjacent surfaces. The present invention will work effectively placed on the reservoir deck, submerged within the reservoir itself, or placed encompassing or straddling the top track of an above ground pool. It is simple to set-up and adjust, and once adjusted, maintains the adjustment reliably. It is not thrown out of adjustment even when the reservoir is being actively used by swimmers. The present invention is inexpensive to manufacture. It can be removed and replaced or relocated without leaving any trace on the pool or deck surface.

Still further objects and advantages will become apparent from a consideration of the ensuing description and accompanying drawings.

REFERENCE NUMERALS

Figure 1:
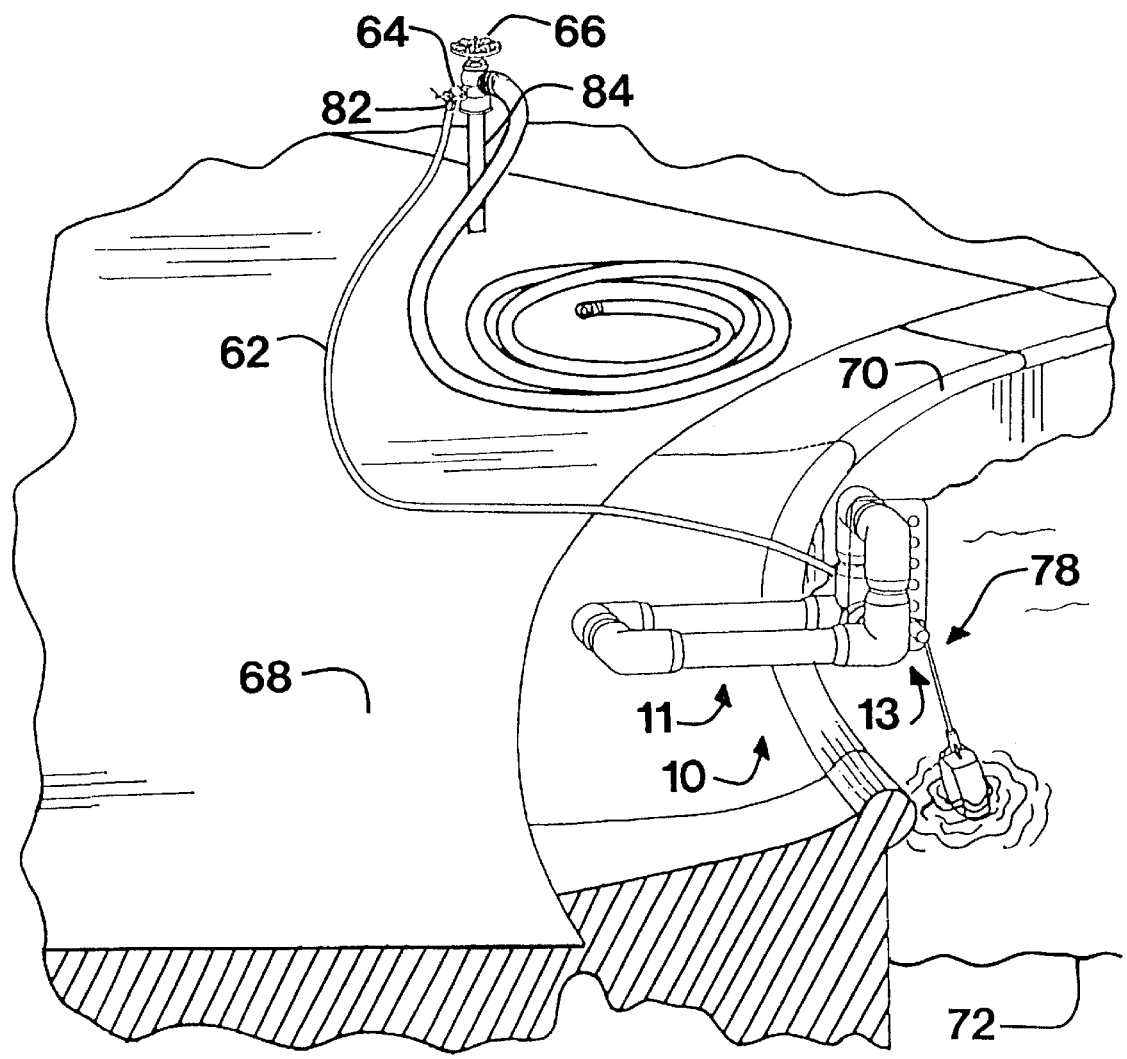
FIG. 1 is a perspective view of the apparatus in its environment.

10 Liquid Level Control Apparatus
11 base
13 vertical support
20 right aft 90 degree elbow
22 aft horizontal link
24 left aft 90 degree elbow
26 left horizontal link
28 left 3-way elbow
30 left vertical link
32 left fore 90 degree elbow
34 right horizontal link
36 right 3-way elbow
38 right vertical link
40 right fore 90 degree elbow
42 fore top horizontal link
44 fore bottom horizontal link
46 stanchion
48 valve stem 50 valve stem nut
52 control valve
54 float adjusting bracket
56 float arm
58 float
60 float adjust screw
62 conduit for liquid
64 needle valve
66 spigot
68 reservoir deck
70 pool edge
72 liquid surface
74 support holes
76 adjustment holes
78 control valve assembly
80 float adjust bracket pin
82 compression nut
84 liquid supply conduit
86 left middle 90 degree elbow
88 left middle link
90 right middle 90 degree elbow
92 right middle link
94 reservoir wall
96 ballast
98 bulkhead

SUMMARY

Thus there is provided according to the invention a means for automatically maintaining a desired water level in a swimming pool, hot tub, or pond. The apparatus is able to rest on the deck surrounding the reservoir or placed inside the reservoir to provide a predetermined amount of water by shutting off a valve when the desired high level is reached and opening the valve to allow water in when the reservoir has dropped to a pre-determined low level. The valve assembly uses a nonferrous preferably hollow type of support structure that can be filled with liquid or some other ballast that will hold the valve assembly over the reservoir in cantilever fashion or hold the valve assembly submerged allowing the apparatus to be conveniently concealed in a pond with nothing but the float showing.

Easy to assemble and adjust

Maintains adjustment reliably

Allows usage of the apparatus and the existing garden hose at the same time

Maintains its position on deck, wall, ground or submerged through the use of interior ballast No bolting or clamping required—thus protecting the surrounding deck and reservoir surfaces.

No ferrous materials used—thus protecting the surrounding deck and reservoir surfaces from rust stains.

Versatile configuration allows float to reach a wide range of water levels

Control valve assembly adjustments allow apparatus to be positioned on uneven surfaces Available in a wide variety of colors

PREFERRED EMBODIMENT—DESCRIPTION

Figure 2:
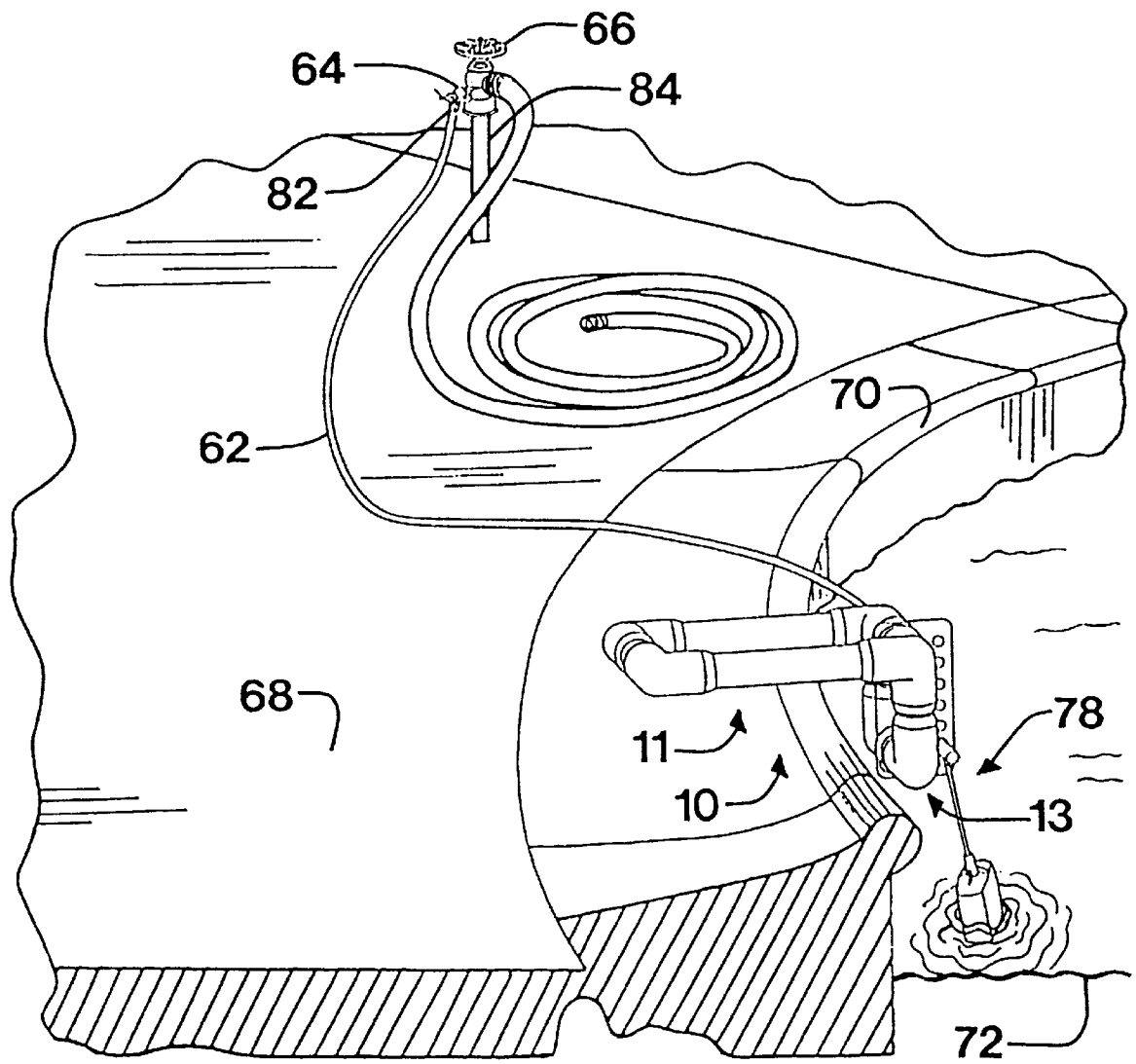
FIG. 2 is a perspective view of the apparatus inverted and placed on the pool deck.
Figure 3:
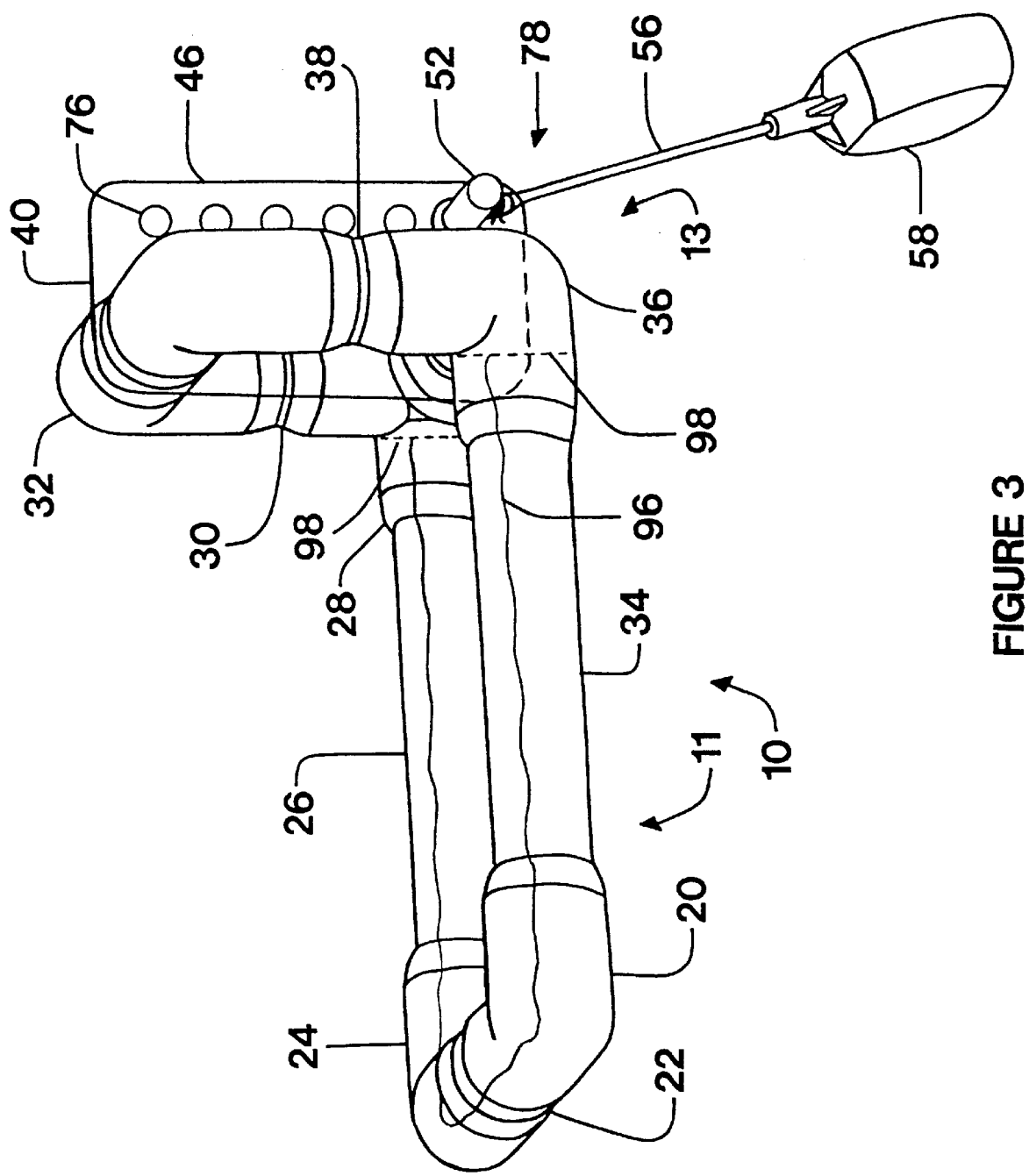
FIG. 3 is a perspective view of the apparatus shown from the side.
Figure 4:
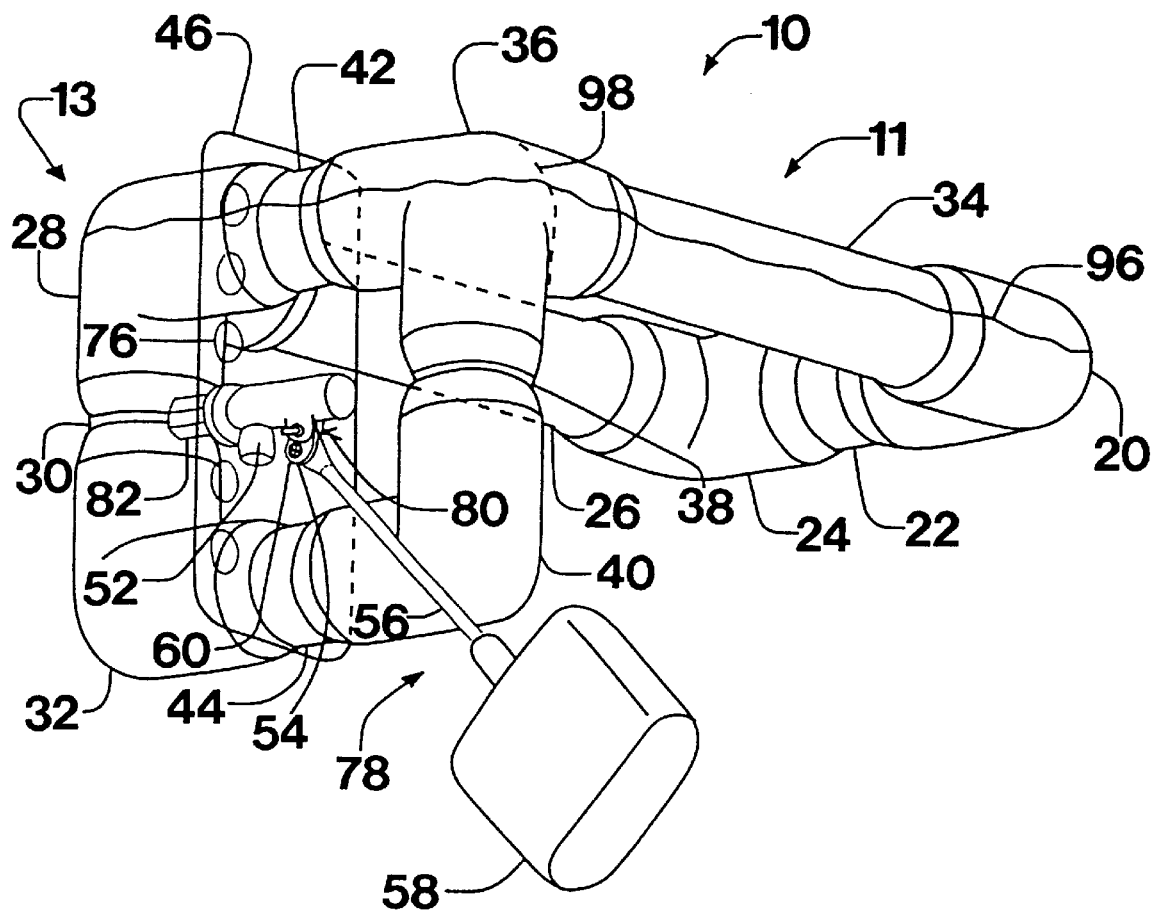
FIG. 4 is a is a perspective view of the apparatus shown in an inverted position.

FIGS. 1 and 2 show typical embodiments of the current invention a Liquid Level Control Apparatus 10 placed on the deck of a reservoir, swimming pool, pond, or hot tub. The level control support apparatus is preferably constructed of Poly Vinyl Chloride pipe but can also be constructed of other suitable material and other cross sectional design. A base 11 is the portion of the apparatus that rests on the deck surface providing the support and ballast 96 for the rest of the apparatus. Referring to FIGS. 3 and 4, the base 11 has a right aft 90 degree elbow 20 that connects to a aft horizontal link 22 that connects to a left aft 90 degree elbow 24. The open end of the right aft 90 degree elbow 20 is connected to a right horizontal link 34. The open end of the left aft 90 degree elbow 20 is connected to a left horizontal link 26. The right horizontal link 34 is connected to the opening a of a right 3-way elbow 36 that contains a bulkhead 98 or inner wall sealing the interior of the right 3-way elbow 36. The left horizontal link 26 is connected to the opening a of a left 3-way elbow 28 that contains a bulkhead 98 sealing the interior of the left 3-way elbow 28 refer to FIG. 7. The bulkheads 98 in the left 3-way elbow 28 and the right 3-way elbow 36 allow a ballast 96, counterweight, or fill material, to be contained in the base 11 of the apparatus. The right 3-way elbow 36 opening b connects to a fore bottom horizontal link 44 that connects to the left 3-way elbow 28 opening b, thus completing the base 11.

Figure 7:
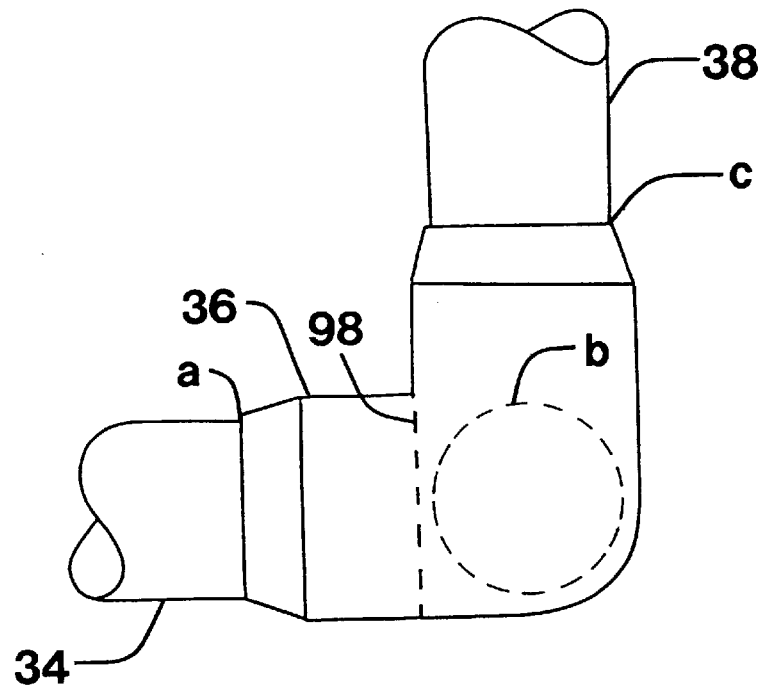
FIG. 7 is a side view of the right side of the 3-way elbow with interior bulkhead. (Typical configuration for the left side 3-way elbow.)

Referring to FIGS. 3 and 4, the base 11 is connected to a vertical support 13. The vertical support 13 is the portion of the apparatus that does not contain ballast 96 (except in the submerged configuration) and is used to support a means for maintaining liquid or control valve assembly 78. Referring to FIG. 7 the right 3-way elbow 36 opening c is connected to a right vertical link 38. The left 3-way elbow 28 opening c is connected to a left vertical link 30. The right vertical link 38 is connected to a right fore 90 degree elbow 40. The left vertical link 30 is connected to a left fore 90 degree elbow 32. The right fore 90 degree elbow 40 is connected to a fore top horizontal link 42. The fore top horizontal link 42 is connected to the left fore 90 degree elbow 32 thus completing the vertical support 13.

Figure 6:
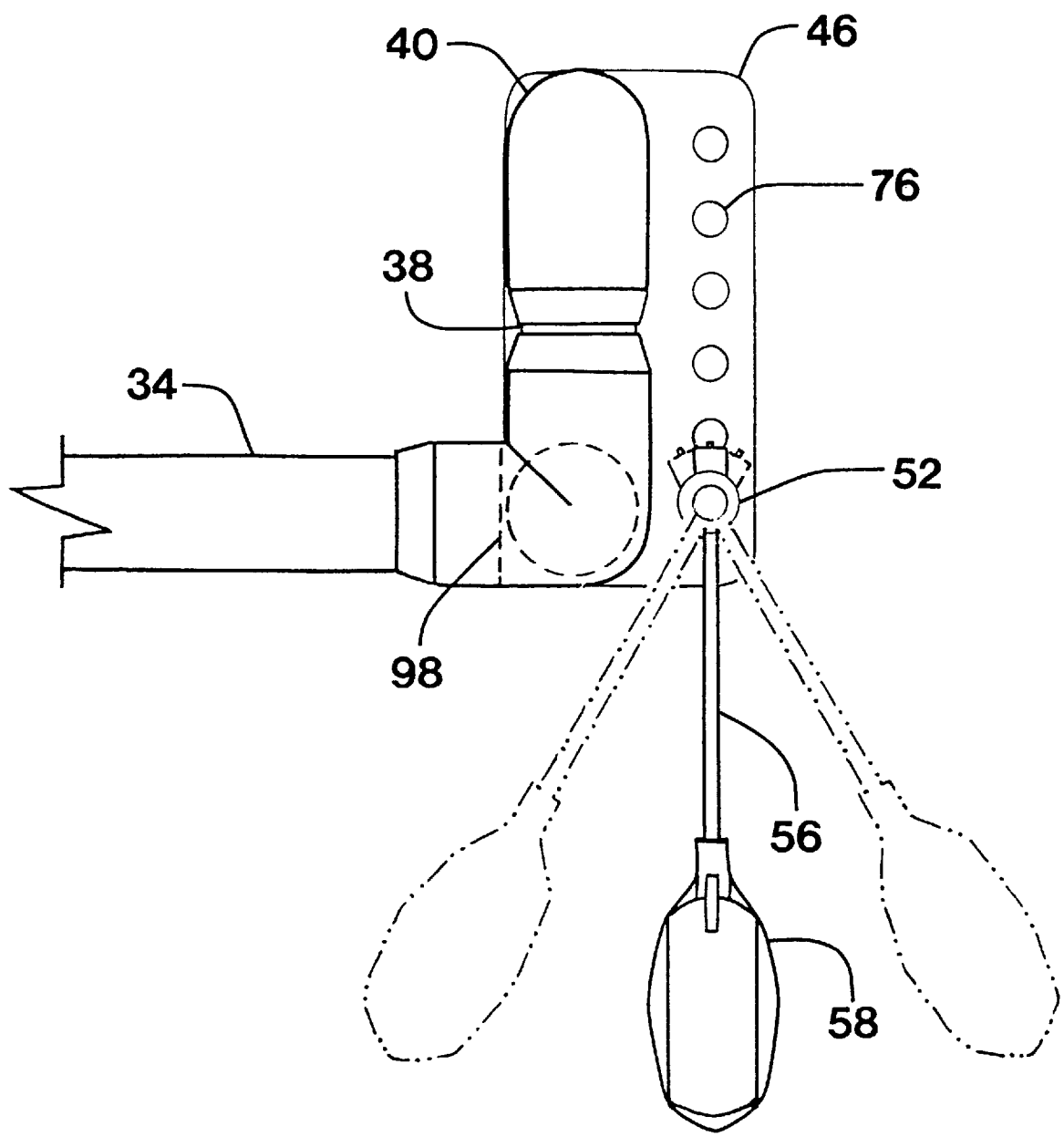
FIG. 6 is a side view of the apparatus showing the perpendicular rotation of the valve assembly.
Figure 8:
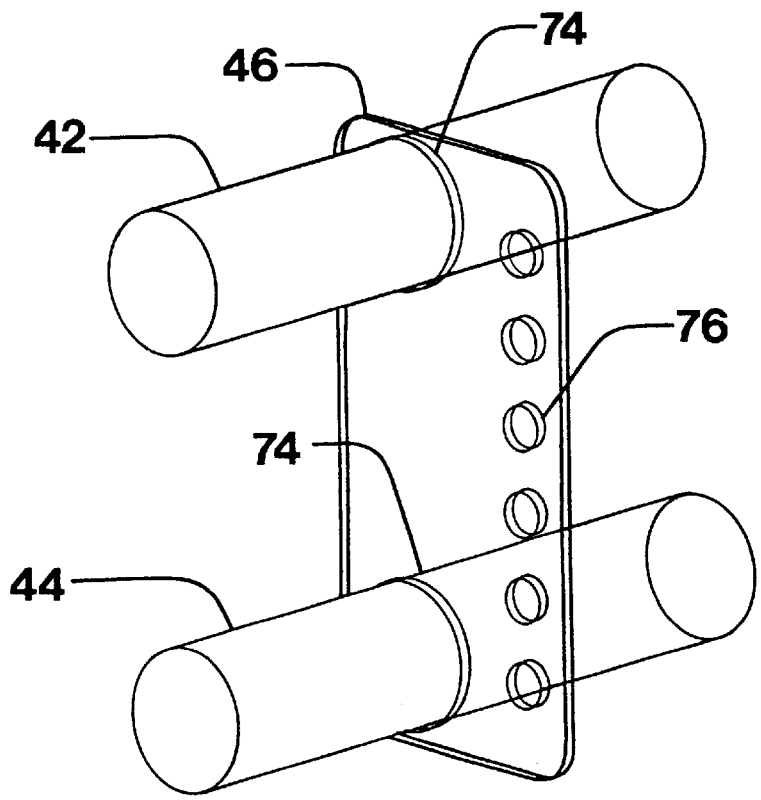
FIG. 8 is a perspective view showing stanchion details.

Attached to the vertical support 13 is an extension arm or a stanchion 46 that is oriented perpendicular to the vertical support 13 see FIG. 8. The stanchion 46 is attached to the vertical support through a plurality of support holes 74 through which the fore top horizontal link 42 and fore bottom horizontal link 44 pass. The stanchion 46 has a plurality of adjustment holes 76 used to raise or lower the control valve assembly 78. The adjustment holes 76 allow the control valve assembly 78 to be perpendicular to a liquid surface 72 in the reservoir see FIG. 6.

Figure 5:
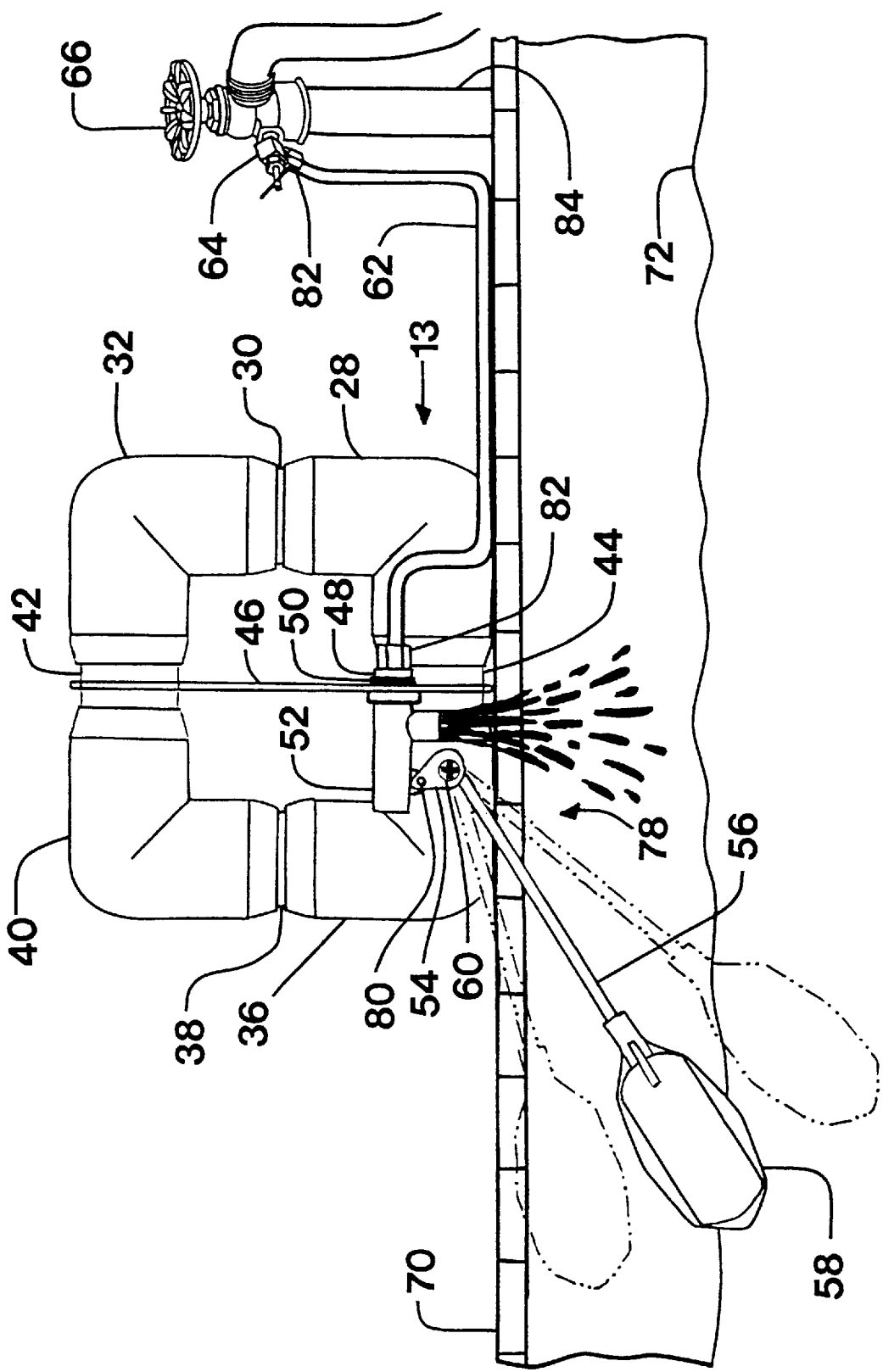
FIG. 5 is a front view of the apparatus placed on the reservoir deck.

The control valve assembly 78 consists of a control valve 52 mounted to the stanchion 46 by inserting a valve stem 48 through one of the adjustment holes 76 using a valve stem nut 50 screwed on to the valve stem 48 see FIG. 5. A float adjusting bracket 54 is secured to the control valve 52 using a float adjust bracket pin 80. The float arm 56 is secured to the float adjusting bracket 54 by a float adjust screw 60. The float arm 56 is threaded on one end and is screwed onto a float 58 thus forming the control valve assembly. A conduit for liquid 62, preferably flexible, is terminated inside the valve stem 48 using a compression nut 82. The conduit for liquid 62 connects to a needle valve 64 located on a spigot 66. The spigot 66 is attached to a liquid supply conduit 84.

Figure 9:
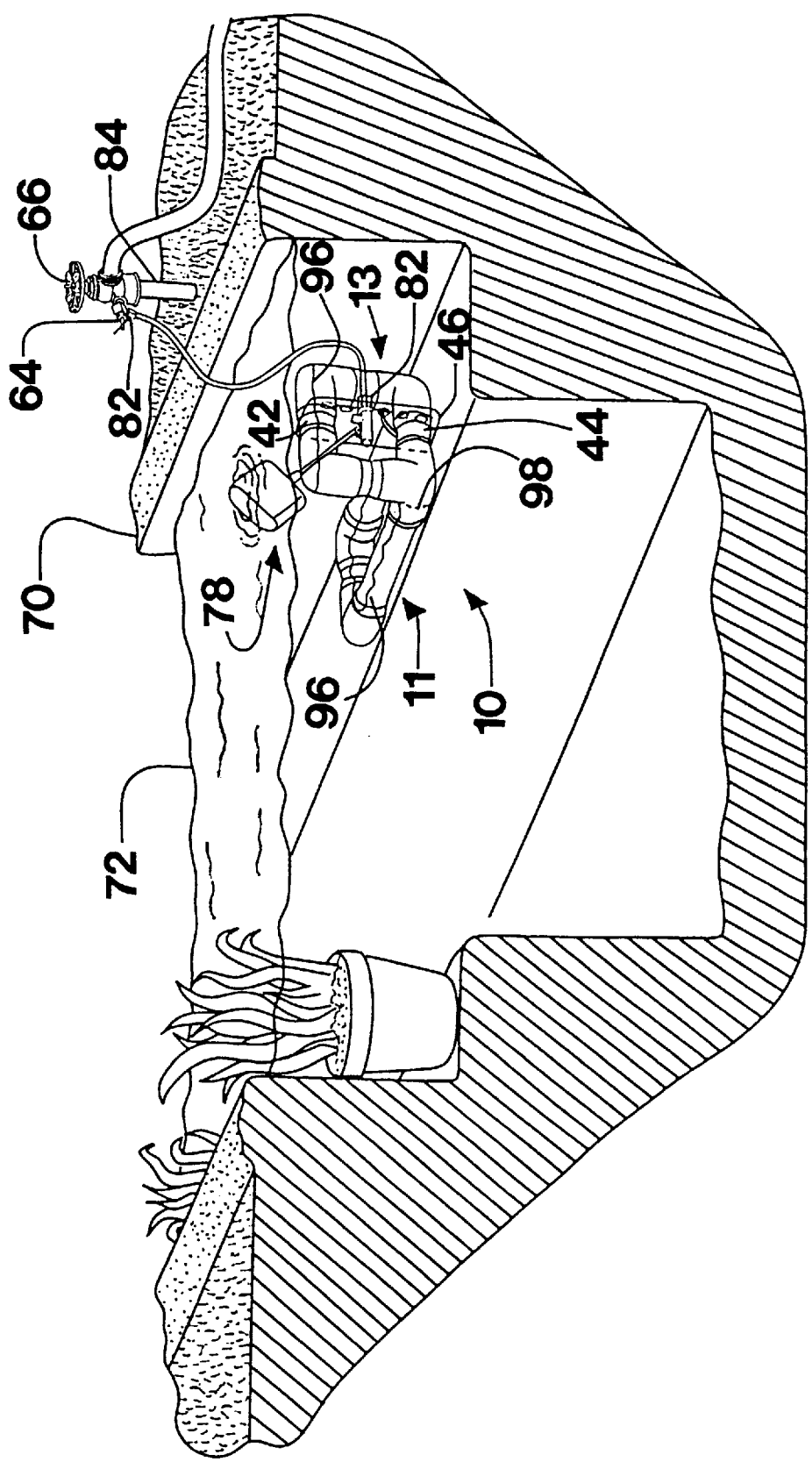
FIG. 9 is a perspective view of the apparatus shown submerged.

FIG. 9 shows the Liquid Level Control Apparatus 10 in the submerged position. It is assembled in the above manner except that the vertical support 13 and base 11 are both filled with ballast 96 to maintain the submerged position of the apparatus.

Figure 10:
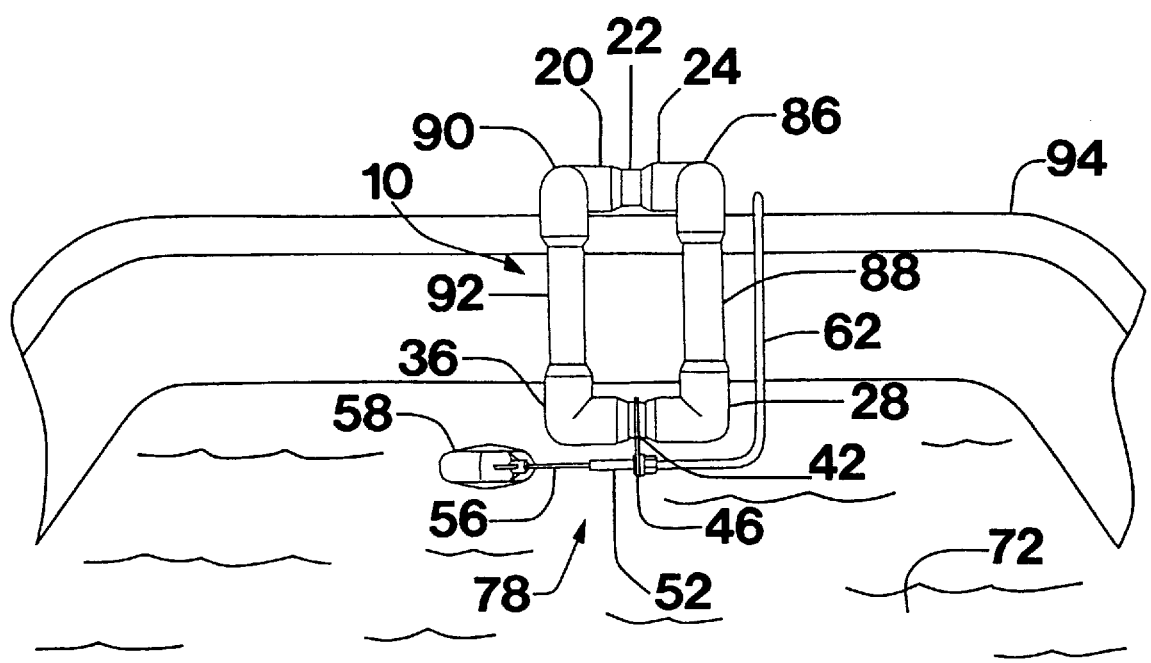
FIG. 10 is a top view of the apparatus mounted on an above ground pool.
Figure 11:
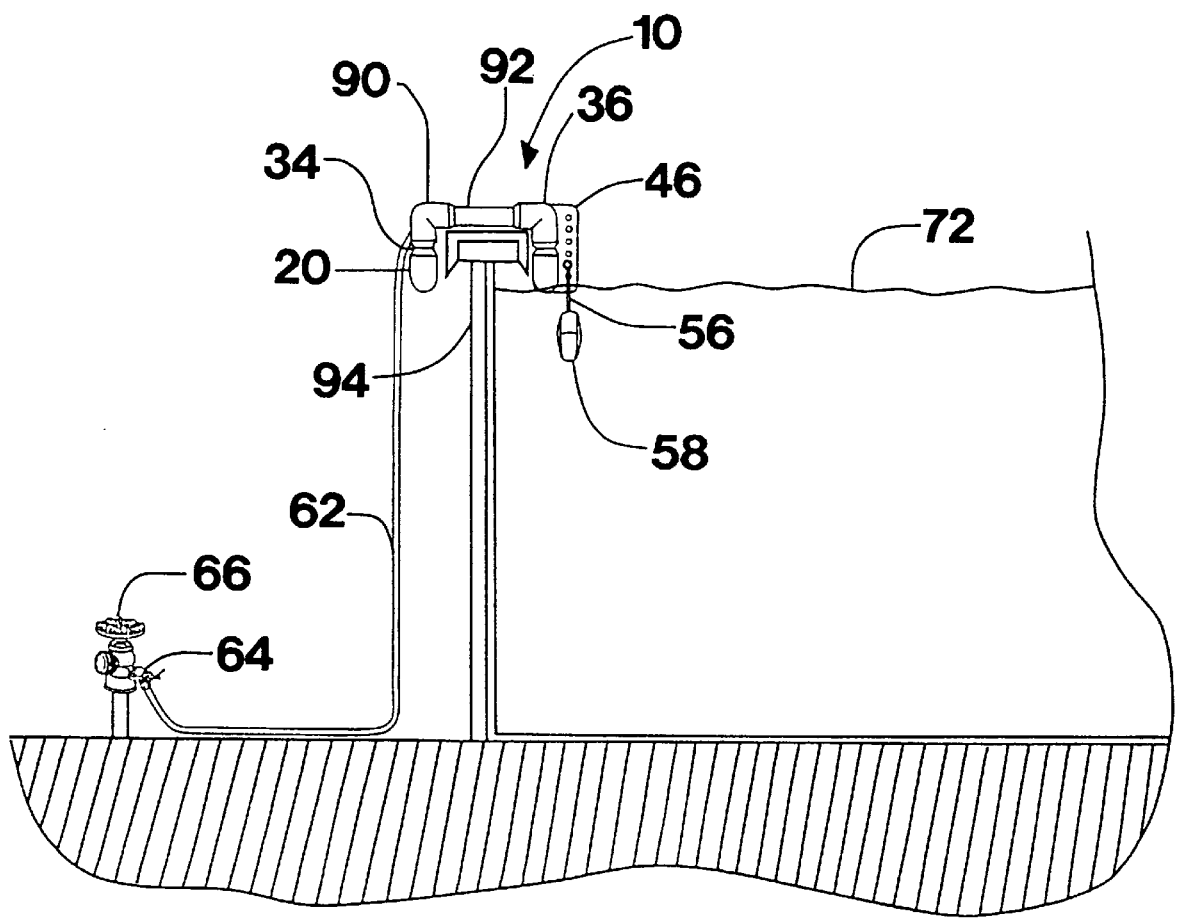
FIG. 11 is a perspective view of the apparatus mounted on an above ground pool.

FIGS. 10 and 11 show the Liquid Level Control Apparatus 10 in a configuration for above ground pools. This requires the addition of a left middle 90 degree elbow 86 connected to the left Horizontal link 26. The left middle 90 degree elbow 86 is connected to a left middle link 88. A right middle 90 degree elbow 90 is connected to the right horizontal link 34. The middle 90 degree elbow 90 is connected to the right middle link 92. The left middle link 88 is connected to the left 3-way elbow 28 opening a and a right middle link 92 is connected to the right 3-way elbow 36 opening a thus forming the configuration for above ground pools.

PREFERRED EMBODIMENT—OPERATION

In operation, the reservoir is filled to a predetermined level see FIGS. 1 and 2. The two horizontal links 26 and 34, FIGS. 3 and 4, are already attached to the vertical support 13 which is supporting stanchion 46 which has control valve assembly 78 mounted to one of the adjustment holes 76. The two 3-way elbows 28 and 36 have bulkheads 98 partitioning opening a from openings b and c, FIG. 6. The horizontal links 26 and 34 are filled with the ballast 96, water or other suitable material, which is contained in the base due to the bulkheads 98 in the two 3-way elbows 28 and 36. The aft portion of the base support 11 which consists of the aft horizontal link 22 the right aft 90 degree elbow 20 and the left aft 90 degree elbow 24 are attached to the two horizontal links 26 and 34 thus forming the horizontal base support 11.

The pool filler support structure 10 can now be placed on the reservoir deck 68 in a fashion that the vertical support 13 stanchion 46 and the control valve assembly 78 are placed over the liquid 72 that is to be maintained at the desired level FIGS. 1 and 2. The float 58 is in contact with the liquid 72. The liquid level control apparatus can be positioned in either a high position FIG. 1 or can be rotated 180 degrees and placed in a low position FIG. 2. These two positions allow for greater range of liquid levels to be controlled. The high position is useful for liquid levels closer to the deck whereas the low position is useful for liquid levels further from the deck.

The spigot 66 has a threaded female port to accept needle valve 64 see FIG. 5. The spigot 66 is attached to the existing or new liquid supply conduit 84. The needle valve 64 is screwed into the threaded female port on spigot 66. One end of the conduit for liquid 62 is attached to the needle valve 64 using a compression nut 82. The other end of the conduit for liquid 62 is attached to the control valve stem 48 using a compression nut 82. The spigot 66 is turned off until such time a user needs to use the spigot 66. When the needle valve 64 is open, liquid can flow from the source to the control valve 52. Once the reservoir is filled to the desired level and the pool filler is placed on the deck, the adjustment to the float 58 and float arm 56 is made. The float adjustment screw 60 is loosened and the float arm 56 is rotated, with float 58 attached to the other end of float arm 56, either up or down to a median point where the flow of liquid through the control valve 52 has just stopped or is a slow drip. The float adjust screw 60 is then retightened. From this point it is a matter of evaporation or spillage that causes a drop in liquid level that allows the float 58 and float arm 56 to pivot downward, due to the drop in liquid level, thus opening the control valve 52 and allowing liquid to flow into the reservoir 72. As the liquid level in the reservoir 72 rises, it will cause the float 58 and the float arm 56 to pivot upward in relation to the rise in liquid level to a point where the high level of liquid will close the control valve 52 shutting off the flow of liquid, thus maintaining the predetermined level of liquid.

In the submerged placement of the Liquid Level Control Apparatus 10, see FIG. 9, the Liquid Level Control Apparatus 10 is operated in the same manner as above but with the base 11 and the vertical support 13 both filled with ballast 96.

In the above ground swimming pool configuration, FIGS. 10 and 11, the Liquid Level Control Apparatus 10 is operated in the same manner as above but with the addition of the left middle elbow 86 connected to the left horizontal link 26. The left middle elbow 86 is connected to the left middle link 88. The right middle 90 degree elbow 90 is connected to the right 3-way elbow 36 and the left middle link 88 is connected to the left 3-way elbow 28. The Liquid Level Control Apparatus 10 straddles, encompasses, or is hung over the top of a reservoir wall 94 with the vertical support 13, the stanchion 46 and the control valve assembly 78 on the liquid side of said above ground pool.

CONCLUSIONS, RAMIFICATIONS, AND SCOPE

It will be understood by those skilled in the art that there has been provided a versatile liquid level control apparatus for use with new and previously constructed reservoirs, ponds and above ground pools. This apparatus requires no structural modifications to any of the above mentioned reservoirs. It will also be evident to those skilled in the art that many alternative configurations, modifications and variations can be made to the above mentioned invention. Thus the scope of the invention should be determined by the appended claims and their legal equivalents, rather than by the examples given.

What is claimed is:

1. An apparatus for maintaining liquid in a reservoir at predetermined levels comprising:

a source of liquid under pressure;

a spigot having an inlet opening and an outlet opening wherein said inlet opening is connected to said source of liquid under pressure;

a supply valve mounted in said spigot and operated to permit flow from said spigot inlet to said spigot outlet;

a control valve assembly for maintaining a selected level of liquid in said reservoir and including a control valve moveable between open and closed positions, and a float buoyantly supported on the surface of said liquid in said reservoir and coupled to said control valve of said control valve assembly to move said control valve between said open and said closed positions responsive to liquid level in said reservoir, whereby a drop in liquid level in said reservoir lowers the vertical elevation of said float, thereby opening said control valve and a rise in liquid level in said reservoir elevates the vertical level of said float, thereby closing said control valve;

conduit means connected between said supply valve and said control valve assembly for conveying liquid from said source of liquid to said control valve assembly;

a ballast container in which a ballast material is located and which rests upon a reservoir deck adjacent to said reservoir;

a stanchion secured to said ballast container and including means for mounting said control valve assembly at a selected position from among a plurality of vertically separated positions thereon; and a clamp for securing said control valve assembly at said selected position vertically and pivotably on said stanchion;

said ballast container is comprised of a plurality of hollow, elongated horizontal and vertical members and means for joining said elongated horizontal and vertical members together.

2. An apparatus according to claim 1 further comprising a float arm that couples said float to said control valve and a float adjust member that secures said float arm to said control valve at a selected angle of orientation relative thereto.

3. An apparatus according to claim 1 further comprising bulkheads in said ballast container located between said horizontal and said vertical members, whereby said ballast material is confined to said horizontally elongated members thereof.

4. An apparatus according to claim 1 further comprising 90 degree elbows of hollow cross section that slidably join said horizontal and vertical members of said ballast container, thereby joining said horizontal members together and said vertical members together.

5. An apparatus according to claim 1 wherein said means for joining said elongated horizontal and vertical members together includes a plurality of three-way elbows that each contain an interior bulkhead therewithin to isolate the enclosure of said elongated vertical members from the enclosure of said elongated horizontal members to allow selected amounts of ballast material to be located within said horizontal members and said vertical members.

6. An apparatus according to claim 1 wherein said deck is located within said reservoir below the surface of liquid therein and said ballast material is located within both said elongated horizontal members and said elongated vertical members and said ballast container is submerged in said reservoir.

7. An apparatus according to claim 1 wherein said spigot is further provided with a garden hose outlet and connection, thereby allowing simultaneous use of said apparatus and a garden hose.

8. An apparatus according to claim 1 wherein said spigot has a female opening and said supply valve is threaded into said female opening of said spigot.

9. An apparatus of claim 1 wherein said conduit is formed of flexible plastic.

10. An apparatus according to claim 1 wherein said stanchion is comprised of a plurality of support holes therethrough and said support holes define said vertically separates positions.

11. An apparatus according to claim 1 wherein said ballast container straddles a reservoir wall wherein said ballast container is comprised of a plurality of hollow, elongated horizontal and vertical members, and said ballast container holds said stanchion cantilevered over said reservoir.

12. An apparatus according to claim 1 wherein said ballast container can be reconfigured and reshaped to fit said existing reservoir and said deck wherein said ballast container is comprised of a plurality of hollow, elongated horizontal and vertical members, and said ballast container holds said stanchion cantilevered over said reservoir.

13. An apparatus for maintaining liquid in a reservoir at predetermined levels comprising:

a source of liquid under pressure;

a spigot having an inlet opening and an outlet opening wherein said inlet opening is connected to said source of liquid under pressure;

a supply valve mounted in said spigot and operated to permit flow from said spigot inlet to said spigot outlet;

a control valve assembly for maintaining a selected level of liquid in said reservoir and including a control valve moveable between open and closed positions, and a float buoyantly supported on the surface of said liquid in said reservoir and coupled to said control valve of said control valve assembly to move said control valve between said open and said closed positions responsive to liquid level in said reservoir, whereby a drop in liquid level in said reservoir lowers the vertical elevation of said float, thereby opening said control valve and a rise in liquid level in said reservoir elevates the vertical level of said float, thereby closing said control valve;

a conduit means connected between said supply valve and said control valve assembly for conveying liquid from said source of liquid to said control valve assembly;

a ballast container in which a ballast material is located and which rests upon a reservoir deck adjacent to said reservoir;

a stanchion secured to said ballast container and including means for mounting said control valve assembly at selected position from among a plurality of vertically separated positions thereon; and a clamp for securing said control valve assembly at said selected position vertically and pivotably on said stanchion;

said reservoir is located below said deck and wherein said ballast container is comprised of a plurality of hollow, elongated horizontal and vertical members, and said ballast container holds said stanchion cantilevered over said reservoir.

14. An apparatus according to claim 13 wherein said elongated vertical members project upwardly away from said reservoir.

15. An apparatus according to claim 13 wherein said elongated vertical members project downwardly from said deck toward said liquid in said reservoir.

* * * * *